United States Patent [19]
Culkin

[11] Patent Number: 5,725,767
[45] Date of Patent: Mar. 10, 1998

[54] TORSION RESISTANT FILTER STRUCTURE

[75] Inventor: Joseph Bradley Culkin, Emeryville, Calif.

[73] Assignee: Calvest Associates, Inc., Stateline, Nev.

[21] Appl. No.: 706,275

[22] Filed: Sep. 14, 1996

Related U.S. Application Data

[63] Continuation-in-part of Ser. No. 601,864, Feb. 15, 1996, abandoned.

[51] Int. Cl.$^6$ .............. B01D 63/00; B01D 24/32
[52] U.S. Cl. .............. 210/321.75; 210/321.84; 210/231; 210/232; 210/356; 210/334; 210/360.1; 210/380.1
[58] Field of Search .................. 210/231, 232, 210/350, 356, 360.1, 334, 331, 493.1, 493.4, 484, 297, 321.75, 321.84, 380.1

[56] References Cited

U.S. PATENT DOCUMENTS

| | | | |
|---|---|---|---|
| 4,025,425 | 5/1977 | Croopnick et al. | 210/321.68 |
| 4,698,154 | 10/1987 | Mohn et al. | 210/321.75 |
| 4,746,428 | 5/1988 | Junker et al. | 210/231 |
| 4,975,188 | 12/1990 | Brumsell et al. | 210/360.1 |
| 5,055,192 | 10/1991 | Artinyan | 210/486 |
| 5,114,588 | 5/1992 | Greene | 210/330 |
| 5,275,725 | 1/1994 | Ishii et al. | 210/321.67 |
| 5,370,796 | 12/1994 | Grimwood | 210/360.1 |

*Primary Examiner*—Ana Fortuna
*Attorney, Agent, or Firm*—Bielen, Peterson & Lampe

[57] ABSTRACT

A filter cartridge for separation of aqueous colloidal suspensions utilizing a shell which forms a chamber having a colloidal suspension inlet and outlets for permeate and concentrate streams. A core is placed within the shell and includes a plurality of filter elements which are located in overlying relationship with one another. Each filter element possesses a relative rigid backing member and a filter membrane. The core is fastened to the shell by connecting a plurality of the backing members to the body of the core.

31 Claims, 7 Drawing Sheets

TORSION RESISTANT FILTER STRUCTURE

CROSS-REFERENCES TO RELATED APPLICATIONS

This application is a continuation-in-part of U.S. application Ser. No. 08/601,864, filed 15 Feb. 1996, now abandoned.

BACKGROUND OF THE INVENTION

The present invention relates to a novel and useful filter cartridge which is employed with a source of torsional or tangential force.

Filtration systems have been devised to separate solid matter from liquids and are used in many technologies. However, the separation of the liquid portion from the solid portion of a colloidal suspension has been problematic and considered, in many industries, difficult to achieve.

U.S. Pat. Nos. 4,952,317 and 5,014,564 describe systems which are employed to separate colloidal suspensions. In those systems, a tangential force is applied to a filtration pack into which the colloidal suspension is directed. Permeate and concentrate streams result from the systems shown in the above patents and have been proven to be extremely useful in many fields.

Although successful, the application of torsional force of a relatively high frequency tends to tear apart or destroy conventional filter packs or cartridges that are placed atop the torsional drive mechanism. Again, referencing U.S. Pat. No. 5,014,564, the drive mechanism used for this purpose is illustrated, therein.

Constructing a filter cartridge which is capable of resisting torsional force breakdown would be a notable advance in the field of colloidal suspension separations.

SUMMARY OF THE INVENTION

In accordance with the present invention, a novel and useful filter pack for separating colloidal suspensions is herein provided.

The filter pack of the present invention exhibits high strength, low density, and a low damping modulus. In this regard, the cartridge of the present invention includes as one of its elements a shell which is constructed of high strength, lightweight material such as a fiber reinforced resin. The shell may be formed such that the fibrous material angles upwardly in a spiral, criss-cross fashion for reinforcement purposes. In addition, the shell includes thickened end flanges to strengthen those portions where attachment takes place to the source of torsion force and to the inlet and outlet conduits communicating with the filter cartridge. Moreover, the shell may also be formed with end plates of relatively rigid construction such as metallic or composite materials.

A core is located within the shell and includes a plurality of filter elements placed in overlying relationship to one another. Each filter element includes a relatively rigid backing member which may be of metallic construction and is capable of spanning the chamber within the shell. In addition, a membrane filter material is placed over the backing member and is separated from the backing member by a spacer to produce a channel for the permeate stream. The permeate stream from each filter element is passed to a central permeate opening and conducted from the filter element by a conduit. Successive, overlying, filter elements are separated from one another by an elastomeric gasket which lies at the periphery of the backing member of each filter element. The gasket seals the edge portion of each filter element and also provides spacing for the courses, which the concentrate stream follows along the membrane surfaces of each filter element. In certain cases, diverter trays may be employed to reverse the flow of the colloidal suspension passing through the filter cartridge. In this way, sediment build-up and clogging is greatly reduced. In certain embodiments, the membrane in backing member may take a corrugated form. Rigid spacer material may also be placed beneath the membrane and above the backing member to permit the membrane to flex and, again, prevent build-up of material within the filter core.

A particular embodiment of the present invention utilizes reinforcing means through the filter elements, particularly one employed to pass the feed and concentrate streams. The reinforcing means may take the form of a grommet formed of any suitable material, such as metal, plastic, ceramic, and the like. The grommet includes an eyelet base and a washer, which is held to the eyelet by a crimping action. The grommet also secures a filter element, including a membrane and backing member. In certain instances, alternating small and large grommets, may be employed to permit the closer stacking of filter elements, thus, increasing the separation capacity of the filter cartridge. The filter elements may also be formed with steps or undulations at the openings to accommodate such structure.

Fastening means is also included for connecting the core to the shell and to restore the shell from expanding to the point of a hoop stress failure. Such fastening means includes connecting the plurality of filter element backing members directly to the shell. Such fastening may take the form of a resinous potting compound being placed at the periphery of the backing members to bond the backing members directly to the shell material which may also be a resinous material. In this regard, the edges of the backing members may be bead blasted or roughened to help the bonding process.

The core filter elements each including a membrane and backing member are formed with at least three openings. The openings of the membrane and backing member are alignable and provide for passage of the entering colloidal suspension stream, the exiting concentrate stream, and the exiting permeate stream.

Plugging prevention may also be further provided for in the present invention by the use of a dam within the channel of the permeate stream found between the membrane and the backing member. The dam is used in conjunction with an impermeable film or element to force permeate flow toward the periphery of the core. In this way, solid cake build-up is avoided and also directs the colloidal suspension to the periphery of the core, where the amplitude of vibration is the largest. Thus, separation of the colloidal suspension into the permeate and concentrate streams is also greatly aided by this structure.

It is believed that a novel and useful filter cartridge for use in separation of aqueous colloidal suspension has been hereinabove described.

It is therefore an object of the present invention to provide a filter cartridge used for separation of aqueous colloidal suspensions which exhibits sufficient strength to resist damage upon the application of torsional forces on the filter cartridge.

Another object of the present invention is to provide a filter cartridge which provides excellent separation of aqueous colloidal suspensions into permeate and concentrate streams in an efficient manner.

A further object of the present invention is to provide a filter cartridge for use in separating aqueous colloidal suspensions which may be scaled up into relatively high flow rate applications.

A further object of the present invention is to provide a filter cartridge useable for separating aqueous colloidal suspensions which permits the use of composite material having high strength to weight characteristics.

Yet another object of the present invention is to provide a filter cartridge useable for separating of aqueous colloidal suspensions which includes a filter core that possesses a structure to greatly eliminate clogging and solid cake build-up.

Another object of the present invention is to provide a filter cartridge used in separating an aqueous colloidal suspension which may be operated under high torsional forces and relatively high pressure to force separation of the colloidal suspension into permeate and concentrate streams.

Another object of the present invention is to provide a filter cartridge used for separation of aqueous colloidal suspensions which successfully resist tangential forces which tends to separate a stack of filter elements within a filter core.

Another object of the present invention is to provide a filter cartridge useable for separating aqueous colloidal suspension that is capable of stacking a multiplicity of filter elements to a high density.

A further object of the present invention is to provide a filter cartridge used for separation of aqueous colloidal suspensions which includes a multiplicity of closely packed filter elements that is relatively simple to manufacture and assemble.

Yet another object of the present invention is to provide a filter cartridge used for separation of aqueous colloidal suspensions which are formed without internal structures that are subject to abrasive attack potentially causing failure of the filter cartridge.

The invention possess other objects and advantages especially as concerns particular characteristics and features thereof which will become apparent as the specification continues.

For a better understanding of the invention reference is made to the following detailed description of the preferred embodiments thereof which should be referenced to the hereinabove described drawings.

DETAILED DESCRIPTION OF THE PREFERRED EMBODIMENTS

Various aspects of the present invention will evolve from the following detailed description of the preferred embodiments thereof which should be taken in conjunction with the hereinabove described drawings.

Figure 1:
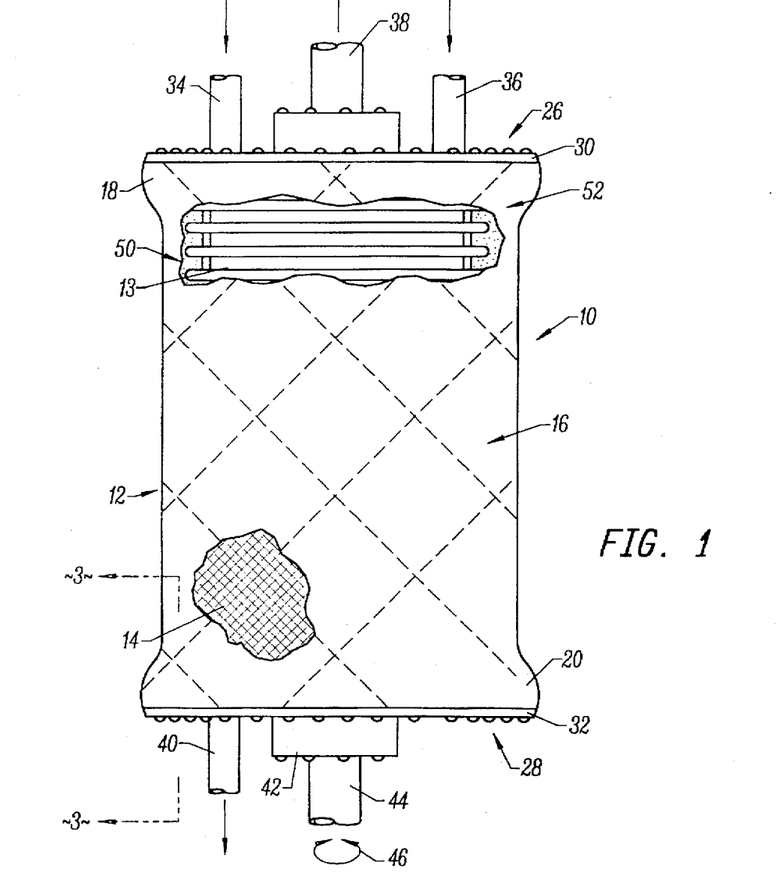
FIG. 1 is a side elevational view of the filter cartridge of the present invention with a broken away portion schematically illustrating the orientation of fibrous material in the shell and a portion of the stacked filter elements in the core therewithin.
Figure 2:
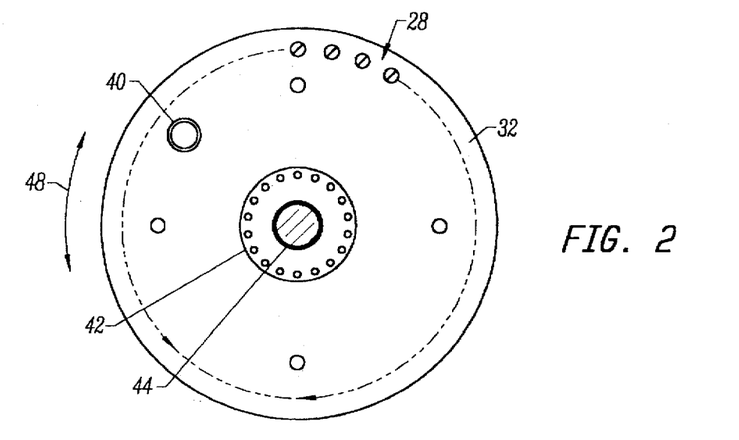
FIG. 2 is a bottom plan view of FIG. 1.
Figures 3, 4:
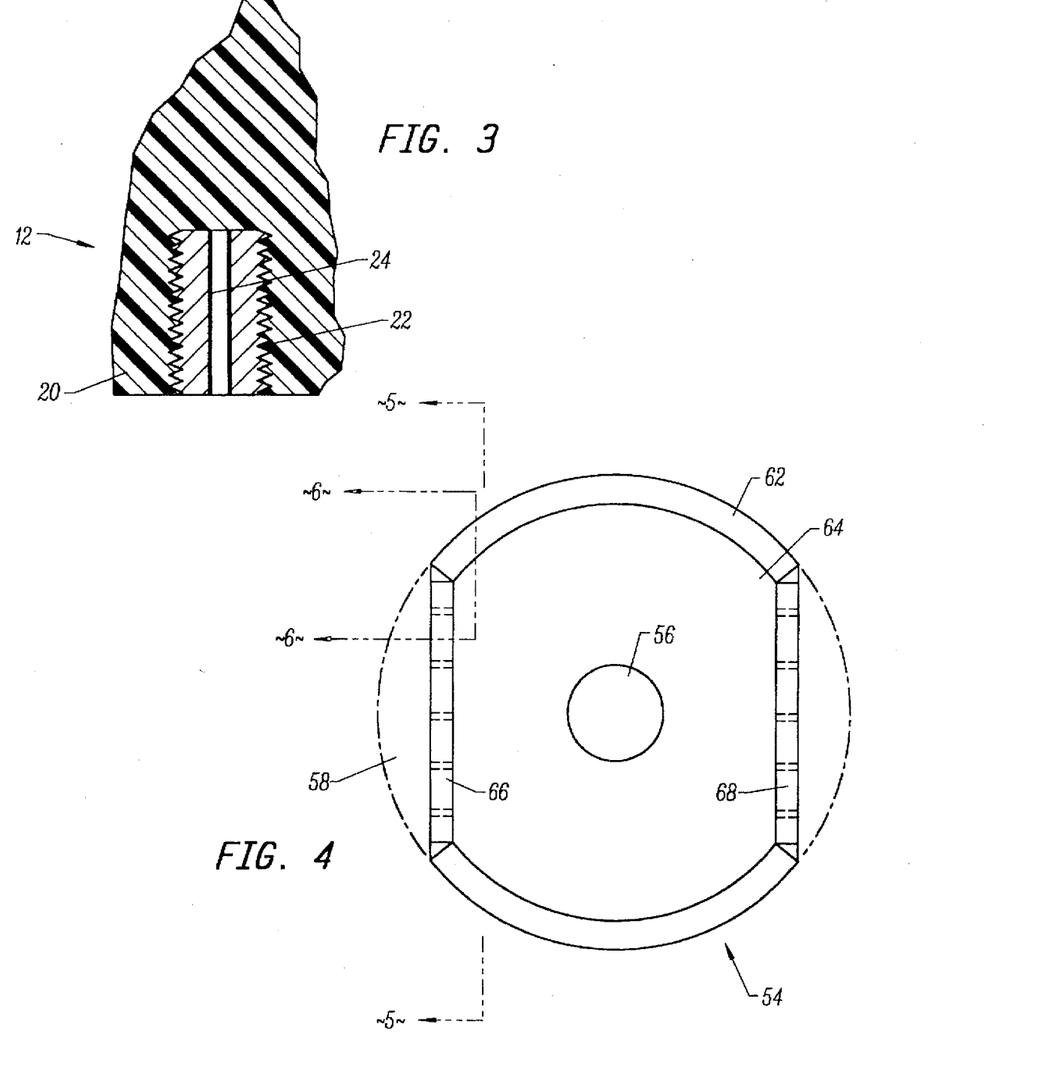
FIG. 3 is a sectional view take along line 3—3 of FIG. 1.
FIG. 4 is a top plan view of a typical filter element.

The invention as a whole is depicted in the drawings by reference character 10. Filter cartridge 10 includes as one of its elements a shell 12 forming an inner chamber 13, FIG. 1. Shell 12 may be constructed of a resinous material such as epoxy and be reinforced by a plurality or multiplicity of fibers such as glass fibers 14. Shell 12 is generally depicted in FIG. 1 as being a cylindrical body. Plurality of fibers 14 extend around shell 12 in a spiral fashion as is indicated by criss-crossing lines 16. That is to say, general parallel fibers spiral around shell 12 in one direction, crossing generally parallel fibers spiraling around the shell 12 in the opposite direction. The pitch of these spiral paths is represented in FIG. 1 is about 45 degrees, however the invention herein is deemed not to be limited to this angle. Plurality of fibers 14 may also take the form of carbon fibers, Kevlar fibers, and the like. Flanges 18 and 20 extend outwardly or bulge at the end portions of shell 12 for the purpose of strength. Exemplary metallic insert 22, FIG. 3, represents one of a number of inserts placed in flanges 18 and 20. Metallic insert 22 includes a threaded surface 24 which accepts threaded bolts. Plurality of threaded bolts 26 and 28, associated with flanges 18 and 20, respectively, are intended to engage threaded surfaces such as threaded surface 24 in each of the threaded inserts employed about the periphery of flanges 18 and 20. End plates 30 and 32 are held to shell 12 by plurality of bolts 26 and 28, respectively. Although only a quartet of bolts are depicted on FIG. 2, plurality of bolts 28 extend completely around the periphery of end plate 32 and end plate 30 of FIG.

1. Conduits 34 and 36 extend through plate 30 and into chamber 13 for the purpose of carrying a colloidal suspension to filter cartridge 10. Permeate conduit 38 extends from the central torsion of cartridge 10 upwardly from end plate 30. End plate 32 serves as a support for concentrate conduit 40 and includes a boss 42 to support shaft 44 which connects to a source of torsional force such as that depicted in U.S. Pat. No. 5,014,564 which is incorporated herewith in its entirety. Directional arrows 46 and 48 on FIGS. 1 and 2, respectively, show the torsional motion imparted to shell 12 by the source of torsional force.

Figure 5:
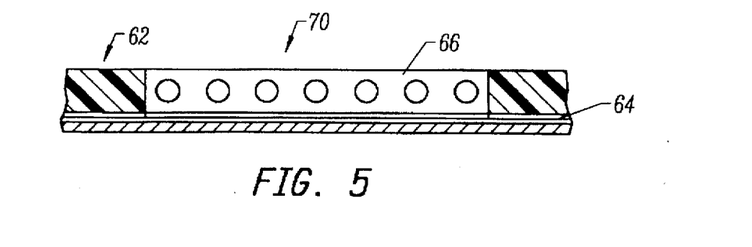
FIG. 5 is a sectional view taken along line 5—5 of FIG. 4.

Filter cartridge 10 also possesses a core 50, FIG. 1, including a plurality of filter elements 52 which are placed in overlying relationship with respect to one another. Filter elements 52 are depicted schematically in FIGS. 1 and 6. With reference to FIG. 4, a typical filter element 54 is depicted in plan view. Central opening 56 is intended to carry permeate through conduit 38, FIG. 1, while recesses 58 and 60 carry the unseparated colloidal suspension, and the eventual concentrate which exits shell 12 through conduit 40. Elastomeric gasket 62 extends about the periphery of filter element 54 on side 64 thereof. It should be noted that a similar gasket would appear on the underside of filter element 54 between the top of the next succeeding filter element of the plurality of filter elements 52. Straight gasket sections 66 and 68 include a plurality of apertures 70, FIG. 5, which permit concentrate to pass along a course from side 64 of filter element 54 to recesses 58 and 60, which will be explained in greater detail hereafter.

Figures 6, 7:
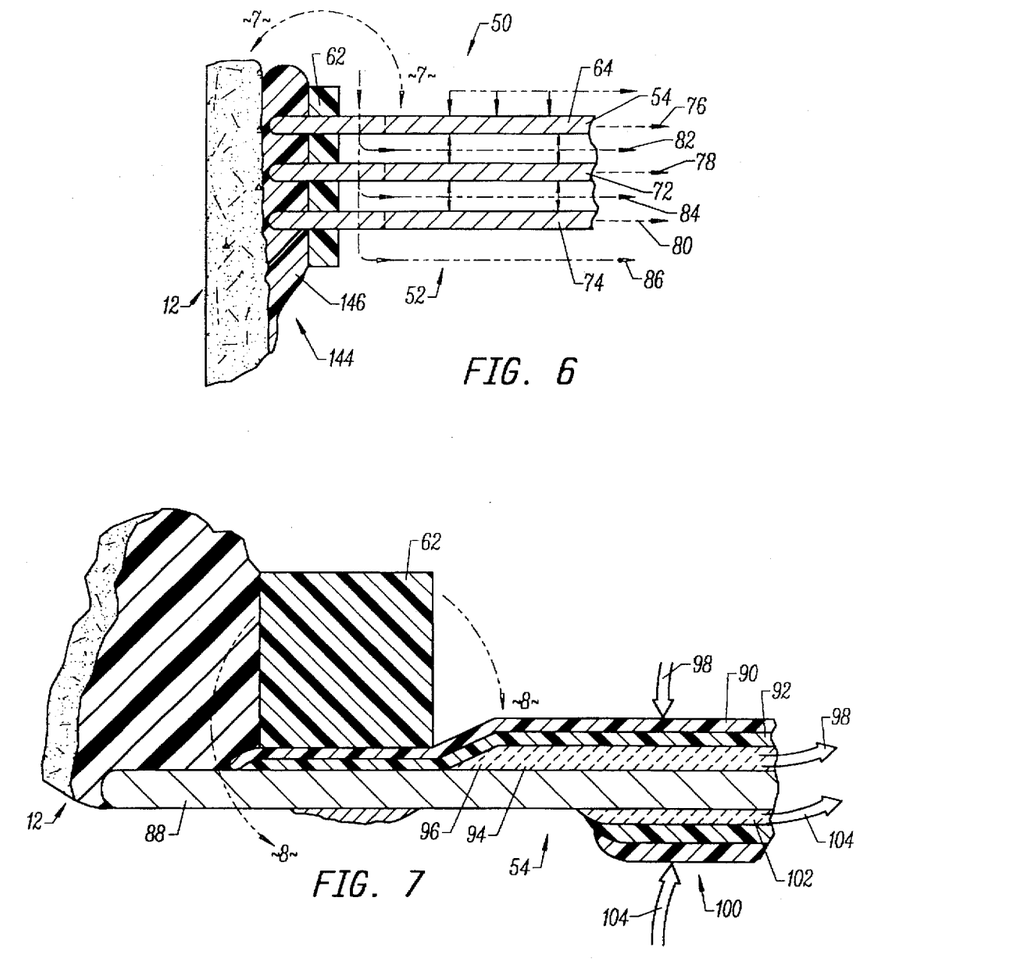
FIG. 6 is a sectional view taken along line 6—6 of FIG. 4.
FIG. 7 is an enlarged view of the elastomeric gasket member in place within a typical tray taken along line 7—7 of FIG. 6.

With reference to FIG. 6 it may be observed that plurality of filter elements 52 are shown typically stacked or in overlying configuration with respect to one another. Filter elements 54, 72, and 74 are shown in generally parallel configuration separated by gaskets at their periphery, identical to gasket 62. Streams 76, 78, and 80 represent permeate flow through filter elements 54, 72, and 74. The streams 82, 84, and 86 represent concentrate flow where flow penetration or filtering takes place with respect to filter elements 54, 72, and 80.

Turning to FIG. 7, it may observed that filter element 54 is shown in detail having a steel backing member 88 which extends into the periphery of shell 12. Membrane layer 90 is placed atop a membrane support 92 which itself overlies a drain cloth 94. The permeate channel 96 is formed between membrane 90 and backing member 88. It should be noted that the proportions of these elements in FIG. 7 have been enlarged for the sake of emphasis in certain cases. For example, membrane layer 90 is generally quite thin. Membrane layer 90 may be formed of certain materials such as Teflon, polysulfone, nylon, polypropylene, and the like. Membrane support 92 may be formed of Kynar, non-woven glass, and the like. Also, drain cloth 94 may be formed of Typar, fiber glass in non-woven form, and the like. It is important that the drain cloth be porous such that permeate, shown by directional arrows 98, passes to permeate recess or opening 56 and through, eventually, permeate conduit 38, FIG. 1. Membrane unit 100 may also be found on the opposite side of backing member 88 from that of membrane 90. Thus, permeate may pass into a channel 102 within the drain cloth element similar to channel 94. Again, permeate will travel to permeate opening 56, per directional arrows 104.

Figure 8:
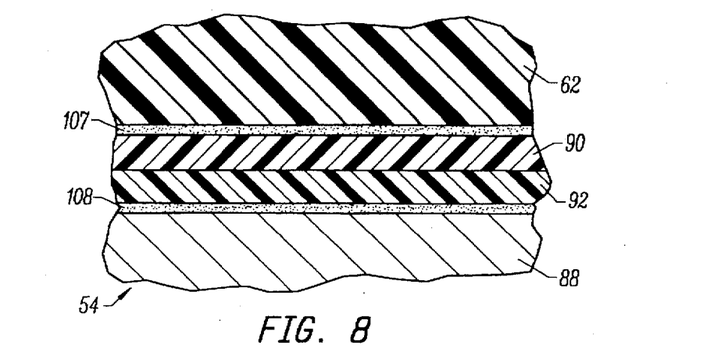
FIG. 8 is an enlarged view of the relationship between the filter element and the gasket member taken along line 8—8 of FIG. 7.

FIG. 8 shows even greater detail where sealing takes place at the periphery of tray 54. Drain cloth 94 does not extend beneath elastomeric gasket 62, in the embodiment of FIG. 8. However, membrane 90 and membrane support are pressed into contact between elastomeric gasket 62 and steel backing member 88. In addition, adhesive layers 107 and 108 are employed to aid in such sealing at the periphery of filter element 54. Adhesive 107 may take the form of an epoxy, a vinylester, melt-blown adhesive, and the like. Adhesive 108 may be constructed of the same materials, as well as a polysulfone material.

Figure 9:
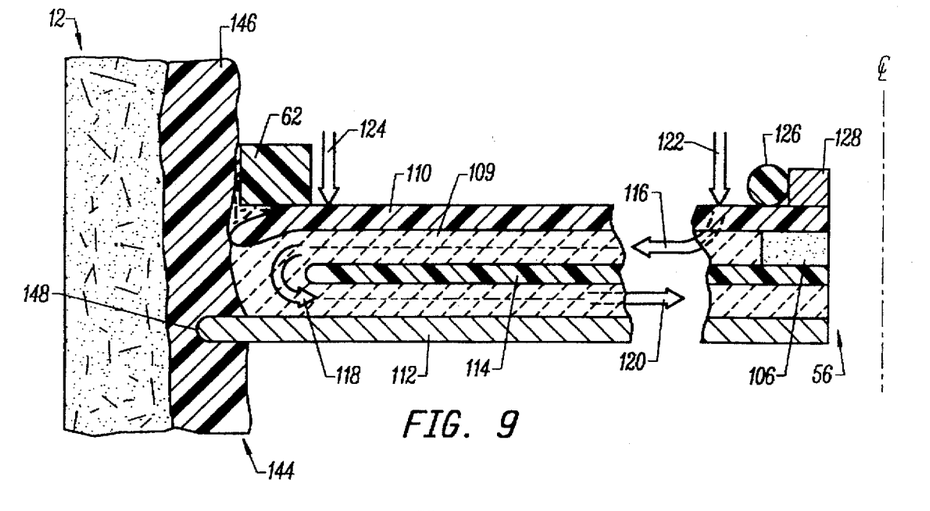
FIG. 9 is a sectional view illustrating the damming element in the permeate channel.

With reference to FIG. 9, another embodiment of the present invention is shown in which a dam 106 of impenetrable material is placed within permeate channel 109 formed between backing membrane 110 and stainless steel plate 112. Impenetrable film 114 splits permeate channel 108 into two parts such that permeate entering permeate channel 108 must follows the route shown by directional arrows 116, 118, and 120 to central opening 56. Directional arrow 122 represents the minimum flux in this case, while directional arrows 124 represents the maximum flux. O-ring 126 and stainless steel gasket 128 seal central opening 56 against passage of material. Thus, the maximum transmembrane pressure is found at the outside diameter of filter core 50 and the minimum transmembrane pressure at the inner diameter of core 50. It has been found that the addition of dam 106 and impenetrable film 114 prevents the build-up of solid cake material within cartridge 10.

Figure 10:
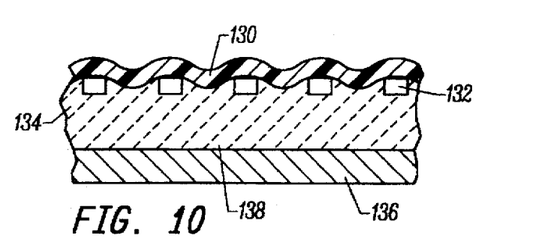
FIG. 10 is a sectional view showing a corrugated membrane embodiment of the present invention.
Figure 11A:
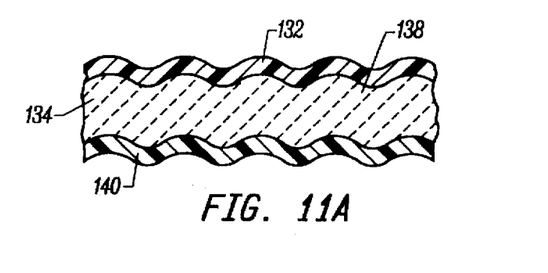
FIG. 11A is a sectional view showing a ridged backing member embodiment of the present invention.
Figure 11B:
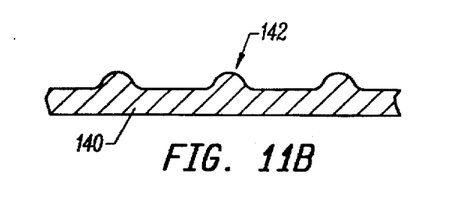
FIG. 11 is a sectional view showing a corrugated membrane and backing member embodiment of the present invention.

It has also been discovered that the torsional source vibration may enhance flow if membrane 130, FIG. 10, is formed with a corrugation. A square wave mesh 132 may be placed within the recessed formed by corrugated membrane 130 and supported by drain cloth 134. Of course, stainless steel support or backing member 136 would also be used to form the permeate channel 138 as in the prior instances. With reference to FIG. 11, backing member 140 of corrugated construction is employed with corrugated membrane 132 to produce the same effect. FIG. 11A represents another embodiment of steel backing member 140 in which the corrugations appear as a series of bumps 142 rather than regular undulations. It has been found that provision of bumps 142 improves the flow through core 50.

Figure 13:
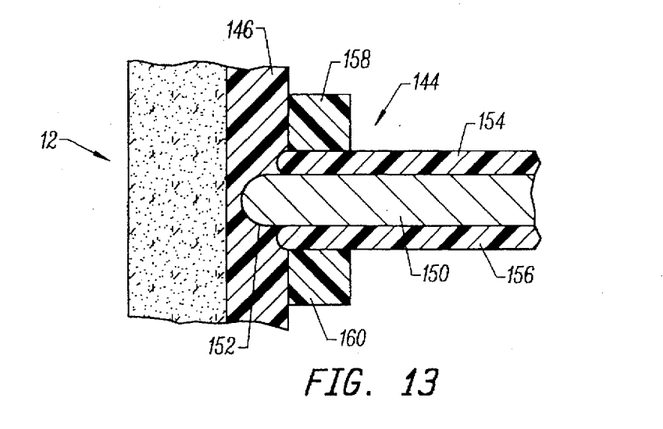
FIG. 13 is a sectional view depicting the roughening of the periphery of the backing member for connection to the shell.

The present invention also includes fastening means 144 for connecting core 50 to shell 12. With reference to FIGS. 6 and 13, it may be observed that fastening means 144 includes the provision of an epoxy material 146 which adheres to shell 12 and to the periphery of steel backing members such as those associated with filter elements 54, 72, and 74. Turning to FIG. 9, it may be observed that steel backing member 112 includes a roughened or bead blasted edge 148 which aids in the use of epoxy material 146 such that backing member 112 is securely fastened to shell 12. FIG. 13 also illustrates steel backing member 150 having roughened edge 152 in conjunction with sandwiching backed membranes 154 and 156. Elastomeric gaskets 158 and 160 are also shown on either side of steel backing member 150.

Figure 12:
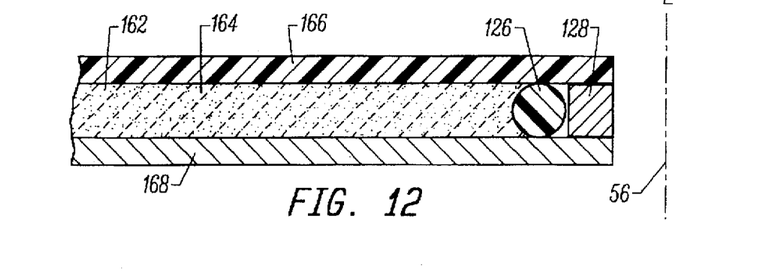
FIG. 12 is a sectional view schematically depicting another embodiment of the present invention in which the spacer in the permeate channel is a porous rigid body.

Turning to FIG. 12, another embodiment of the present invention is depicted in which a relatively rigid spongy material 162 is found in permeate channel 164 between backed membrane 166 and steel backing member 168. For example, material 164 may be steel wool. Backed membrane 166 is normally fastened to the reciprocating steel support under the influence of the operating pressure within shell 12. The spongy material, in contrast, remains in a static state. The result is that scrubbing action occurs between membrane 166 and pad 162. Such scrubbing action eliminates fouling within permeate channel 164.

Figure 14:
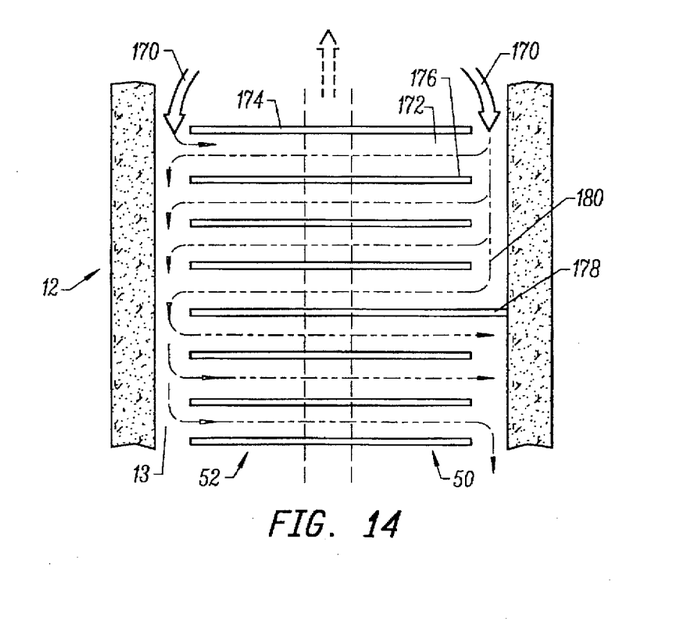
FIG. 14 is a sectional schematic view indicating the flow of concentrate with the use of a diverter tray.

Turning to FIG. 14, a schematic representation of shell 12 is depicted in which core 50 is shown within chamber 13. Colloidal suspension streams 170 and 172 pass around and across plurality of filter element 52 through courses such as course 172 between filter elements 174 and 176. Diverter tray 178 allows the concentrate stream 180 to only pass in one direction through core 50. Diverter tray 178 tends to maintain a cross-flow of velocity according to a specific Reynold's number. The concentrate is thus distributed relatively evenly, although the fluid viscosity on each tray may vary. Diverter trays, such as diverter tray 178, may be placed at multiple levels within core 50 to maintain an even distribution of liquid therewithin.

Figure 15:
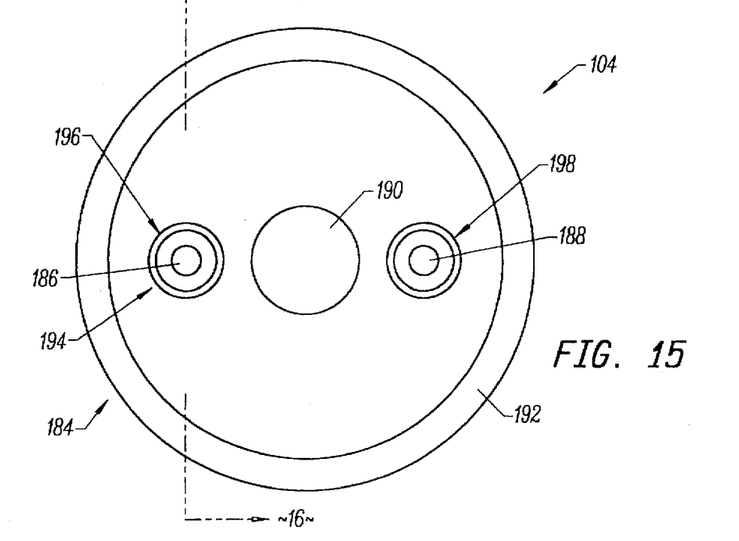
FIG. 15 is a top plan view of a filter element of another embodiment of the present invention.

Referring now to FIGS. 15-20, embodiment 10A of the cartridge filter of the present invention is depicted. A filter element 184 is shown and is intended to be substituted for filter element 54 of FIG. 4 within shell 12. Filter element 184 includes concentrate openings 186 and 188 employed in conjunction with permeate opening 190. Gasket 192 extends around the periphery of such element 184. Reinforcing means 194 is employed to strengthen openings 186 and 188 and to secure portions of filter element 184 to the same. As depicted in FIG. 15, reinforcing means 194 includes grommets 196 and 198 which are essentially are identical in configuration.

Figure 16:
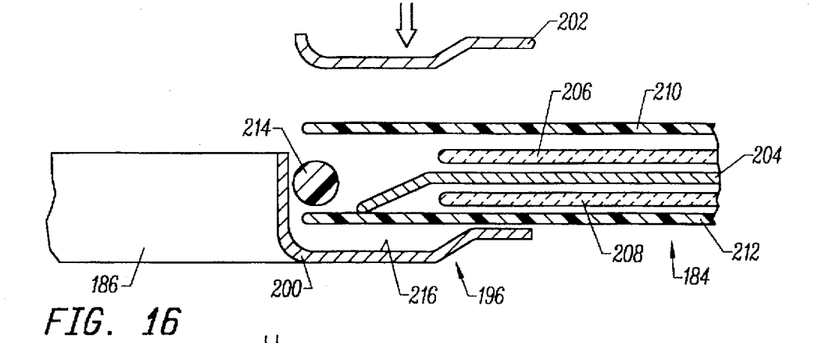
FIG. 16 is an enlarged schematic sectional view taken along line 16—16 of FIG. 15.

Turning to FIG. 16, it may observed that exemplary grommet 196 is depicted in detail with respect to other portions of filter element 184. Grommet 196 includes an eyelet 200 and a washer 202 which are intended to mate with one another and be crimped for permanent attachment. In this regard, backing member 204 of metallic construction is sandwiched on either side by porous drain cloth sheets 206 and 208. Membranes 210 and 212 lie adjacent porous drain cloth sheets 206 and 208. O-ring 214 is positioned adjacent the exterior wall 216 of washer 200 between membranes 210 and 212.

Figure 17:
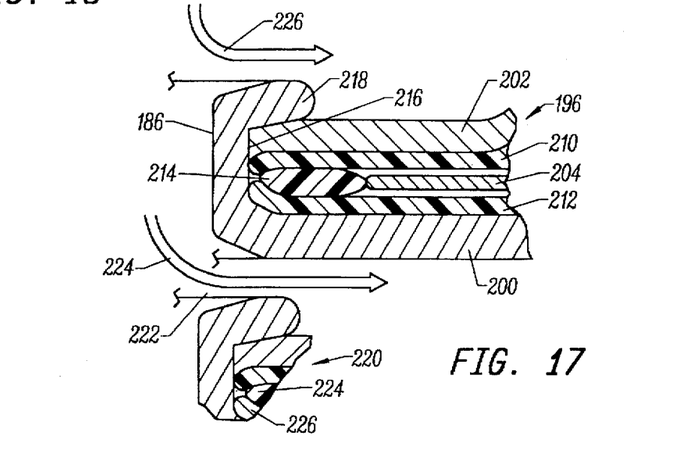
FIG. 17 is a schematic sectional view depicting the grommet member of FIG. 16 in a crimped configuration holding portions of the filter element.

Turning to FIG. 17, it may be observed that washer 202 has been squeezed into position by crimped top portion 218 of eyelet 200, thereof. O-ring 214 has been flattened, as depicted in FIG. 17, and lies adjacent backing member or plate 204. Membranes 210 and 212 extend over O-ring 214 and terminate between washer 202 and the exterior wall portion 216 of eyelet 200. A similar reinforcing grommet 220 lies below grommet 196. Gap 222 between grommet 196 and grommet 220 permits feed and concentrate streams to flow along membranes 208 and 210, as well as membranes 224 and 226, shown partially next to grommet 220, directional arrows 224 and 226. The elimination of gaskets 66 and 68 of filter element 54 by the construction shown in FIGS. 15-17, tends to eliminate potential clogging and blockage sites within filter cartridge 10A. Also, the reinforcing means 194 structure is simpler to construct and manufacture.

Figure 18:
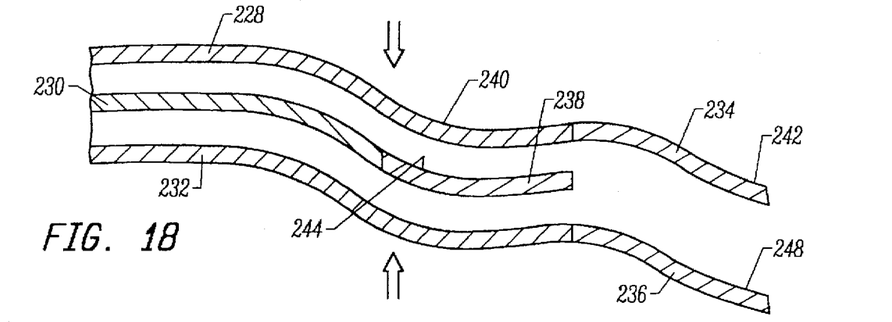
FIG. 18 is a schematic sectional view depicting the use of filter elements having alternating large and small openings with associated grommets.

With reference to FIG. 18, it may be observed that a schematic rendition of stacking arrangements is shown in which filter elements 228, 230, and 232 are depicted. Filter elements 228 and 232 include small grommets 234 and 236. Filter element 230 includes a large grommet 238. It should be understood, that grommets 234 and 236 are associated with openings through filter elements 228 and 232, respectively. On the other hand, filter element 230 possesses a large grommet 238, associated with an opening therethrough which is larger than the openings associated with the grommets 234 and 236 heretofore described. Steps 240 and 242 are found in filter element 228. Filter element 230 includes steps 246, while filter element 232 includes step 248. As may observed, steps 240, 244, and 246 are easily stacked upon one another. The same is true of steps 234 and 248. Such stepping allows the easy stacking of filter elements 228, 230 and 232.

Figure 19:
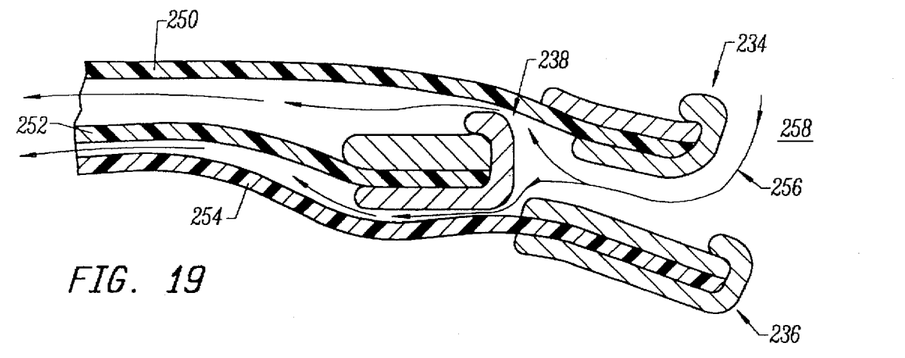
FIG. 19 is a schematic sectional view depicting three filter elements closely stacked using alternating large and small openings and grommets.
Figure 20:
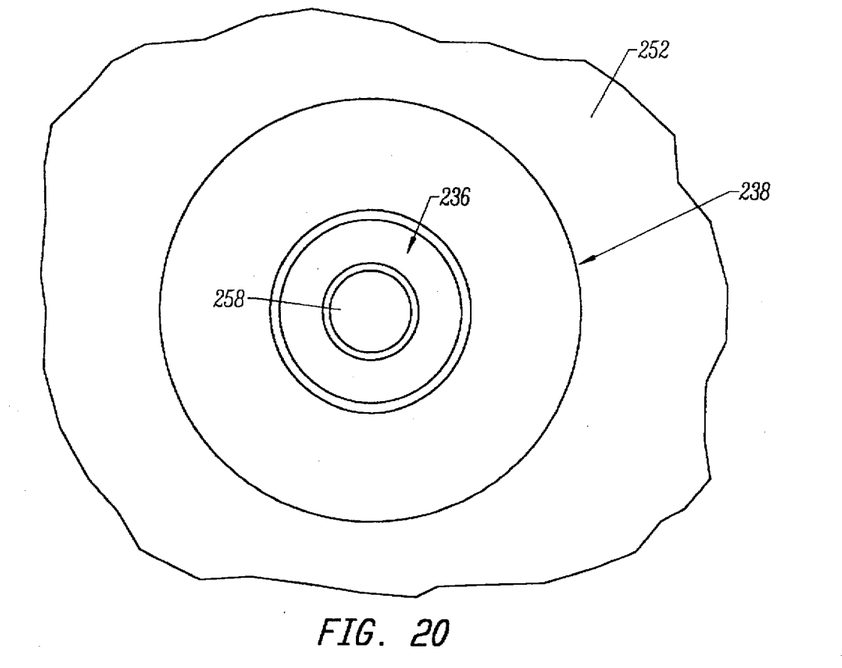
FIG. 20 is a top plan view of a pair of filter elements utilizing large and small openings and grommets for successive stacking of filter elements in this manner.

With reference to FIG. 19, it may be seen that the employment of grommets 234, 236, and 238 of alternating large and small diameters further permits the close stacking of successive filter elements in embodiment 10A. Membrane elements 250, 252, and 254 are schematically shown in FIG. 19 as being associated with grommets 234, 238, and 236, respectively. Each membrane element, of course, includes the structure shown in FIGS. 16 and 17, i.e., a pair of membranes, a pair of drain cloth sheets, and a relatively rigid backing member. Directional arrows 256 depict the intended flow of the stream from a concentrate opening 258. Separation of the colloidal suspension is achieved in a manner similar to that described with respect to embodiment 10, FIGS. 1-14. FIG. 20 depicts a top plan view of membrane elements 252 and grommets 238 and 236, grommet 234 and membrane element 250 having been stripped away for the sake of clarity. It may observed that grommet 236 of membrane element 254 is essentially concentric with grommet 238 in this regard.

In operation, filter cartridge 10 is placed atop a source of torsional force such as that shown in U.S. Pat. No. 5,014, 564. Such unit is commercially available from New Logic International, Inc. of Emeryville, Calif. under the designation V-SEP, Series I. Cartridge filter 10 is then vibrated torsionally according to directional arrows 46 and 48, FIGS. 1 and 2. Colloidal suspension streams are then passed into conduits 34 and 36 to enter core 50 which consists of a plurality of filter elements 52. Each filter element, such as filter element 54, permits permeate to pass through a central opening or recess 56 and out from core 50 via conduit 38. Concentrate, which flows across plurality of filter elements 52 through concentrate courses, exits cartridge 10 through conduit 40. The extreme torsional forces exerted on cartridge 10 are absorbed by fastening means 144 which employs the stainless steel backing members to restore such forces to prevent the break-up of core 50 when filtering takes place. The embodiment 10A depicted in FIGS. 15-20 separates colloidal suspensions in a similar manner to that depicted in filter cartridge 10. However, each filter element, such as filter element 184, includes reinforcement means 194 in the form of grommets 196 and 198 which eliminate elastomeric gaskets 66 and 68, FIG. 4. In addition, embodiment 10A permits the dense stacking of alternating filter elements to about 8-10 per inch. This is about twice the number of trays which may be stacked using the embodiment 10 of the present invention.

While in the foregoing, embodiments of the present invention have been set forth in considerable detail for the purposes of making a complete disclosure of the invention, it may be apparent to those of skill in the art that numerous changes may be made in such details without departing from the spirit and principles of the invention.

What is claimed is:

1. A filter cartridge for separation of an aqueous colloidal suspension feed stream into a permeate stream and a concentrate stream in conjunction with a source of torsional force, comprising:
 a. a shell forming a chamber, said chamber including a first feed inlet and a first outlet for the permeate stream and a second outlet for the concentrate stream;
 b. a core located within said shell, said core including a plurality of filter elements placed in overlying relationship to one another each of said filter elements including a backing member spanning said chamber of said shell, each of said filter elements further comprising an opening adapted to pass the feed stream of said colloidal suspension, said core further comprising reinforcing means for strengthening said opening and securing a filter element backing member thereto, a shaft having a central conduit for collecting permeate in communication with said permeate outlet; and b. fastening means for connecting said plurality of filter element backing members to said shell.

2. The cartridge of claim 1 in which said reinforcing means further comprises an eyelet and a washer fastened to said eyelet.

3. The cartridge of claim 2 which additionally comprises a seal in surrounding relationship with said opening, said seal being sandwiched between said washer and said eyelet.

4. The cartridge of claim 1 in which said filter element additionally comprises a permeable membrane of a predetermined pore size, said permeable membrane lying adjacent said backing member.

5. The cartridge of claim 1 in which said filter element includes a pair of permeable membranes lying adjacent to and on opposite sides of said backing member.

6. The cartridge of claim 5 in which said filter element further comprises a pair of porous spacer elements each located between one of said permeable membranes and said backing member.

7. The cartridge of claim 1 in which said filter element opening includes one opening of a certain size in a first filter element and another opening of a larger size in an adjacent second filter element.

8. The cartridge of claim 7 in which said reinforcing means one and another filter element openings each include an eyelet and a washer fastened to said eyelet.

9. The cartridge of claim 8 in which said one and another openings are partially coincident with one another.

10. The cartridge of claim 9 in which a backing member is formed with cross sectional configuration having multiple steps.

11. A filter cartridge for separation of an aqueous colloidal suspension feed stream into a permeate stream and a concentrate stream in conjunction with a source of torsional force, comprising:

a. a shell forming a chamber, said chamber including a first feed inlet and a first outlet for the permeate stream and a second outlet for the concentrate stream, said shell being constructed of resinous material;

b. a core located within said shell, said core including a plurality of filter elements placed in overlying relationship to one another each of said filter elements including a backing member spanning said chamber of said shell, and a shaft having a central conduit for collecting permeate in communication with said permeate outlet; and c. fastening means for connecting said core to said shell, said fastening means including a material bondable with said resinous material of said shell and with each of said backing member of each of said filter elements.

12. The cartridge of claim 11 in which each of said elements plates further possesses a permeable membrane of a pre-determined pore size, said backing member and said membrane each including first and second opening for passage of the concentrate stream and a third opening for passage of the permeate stream, said first, second, and third openings of said membrane being alignable with the correspondence first, second, and third openings of the backing member.

13. The cartridge of claim 11 which additionally includes a diverter element placed in overlying relationship to any one of said plurality of filter elements.

14. The cartridge of claim 11 in which said shell resinous material is further constructed of a plurality of fibers, said plurality of fibers at least partially surrounding said chamber, said fibers being embedded in said shell resinous material.

15. The cartridge of claim 14 in which said plurality of fibers form a spiral path in said shell.

16. The cartridge of claim 11 in which said shell includes a first and second end portions each possessing flanges extending outwardly from said chamber.

17. The cartridge of claim 16 in which said cartridge further comprises first and second end plates fastened to said shell and connecting means for holding said cartridge to the source of torsional force.

18. The cartridge of claim 11 in which each of said filter elements includes a membrane and a porous spacer element for separating said membrane from the backing member to form a channel for the permeate stream, said channel communicating with the permeate stream opening through said membrane.

19. The cartridge of claim 18 which additionally comprises an elastomeric gasket, the periphery of said membrane being sandwiched between said elastomeric gasket and said backing member, said elastomeric gasket forming a concentrate stream flow course between said membrane and the backing member of an overlying filter element.

20. The cartridge of claim 19 in which said elastomeric gasket also engages said backing member of an overlying filter element.

21. The cartridge of claim 20 in which said filter element includes a membrane support engaging said membrane.

22. The cartridge of claim 20 in which the periphery of said membrane support is sandwiched between said membrane and said backing member.

23. The cartridge of claim 22 which further includes a first adhesive layer interposed said elastomeric gasket and said periphery of said membrane, and a second adhesive layer interposed said periphery of said membrane support and said backing member.

24. The cartridge of claim 19 in which said elastomeric gasket includes a plurality of openings therethrough to permit flow of the concentrate stream between said concentrate stream flow course and the first and second openings through said membrane and said backing member.

25. The cartridge of claim 12 further comprising a dam placed adjacent said membrane in said channel for the permeate stream, said dam capable of preventing passage of particules of said permeate stream from said channel to said third permeate stream opening, and an impermeable element placed in engagement with said dam causing a change of direction of said permeate stream within said channel toward the shell of said filter cartridge.

26. The cartridge of claim 18 in which said porous spacer element is a rigid element and said membrane is a flexible membrane.

27. The cartridge of claim 11 in which said plurality of backing member of said plurality of filter elements each include a peripheral roughened surface embedded in said material bondable with said resinous material of said shell.

28. A filter cartridge used for separation of an aqueous colloidal suspension into a permeate stream and a concentrate stream in conjunction with a source of torsional force, comprising:

a. a shell forming a chamber, said chamber including a feed inlet and a first outlet for the permeate stream and a second outlet for concentrate stream;

b. a core located within said shell, said core including a plurality of filter elements placed in overlying relationship to one another, each of said filter elements including a backing member spanning said chamber of said shell, each of said filter elements possessing a permeable membrane of a predetermined pore size, said backing member and said membrane each including first and second openings for passage of the concentrate stream and a third opening for the passage of the permeate stream, said first, second and third openings of said membrane being alignedable with the correspondence first second and third openings of the backing member, said membrane being corrugated; and a shaft having a central conduit for collecting permeated in communication with said third opening; and c. fastening means for connecting said plurality of filter element backing members to said shell.

29. The cartridge of claim 28 which additionally comprises a mesh of material lying adjacent said corrugated membrane.

30. The cartridge of claim 28 which additionally comprises a corrugated membrane support and a porous spacer element lying between said corrugated membrane and said corrugated membrane support.

31. The cartridge of claim 30 in which said backing member is a corrugated member.

* * * * *